United States Patent [19]

Frutschi

[11] 4,148,191
[45] Apr. 10, 1979

[54] METHOD FOR REGULATING THE POWER OUTPUT OF A THERMODYNAMIC SYSTEM OPERATING ON A CLOSED GAS CYCLE AND APPARATUS FOR CARRYING OUT THE METHOD

[75] Inventor: Hansulrich Frutschi, Riniken, Switzerland

[73] Assignee: BBC Brown, Boveri & Company Limited, Baden, Switzerland

[21] Appl. No.: 748,771

[22] Filed: Dec. 8, 1976

[30] Foreign Application Priority Data

Dec. 23, 1975 [CH] Switzerland ............... 16657/75

[51] Int. Cl.² .................................................. F02C 1/04
[52] U.S. Cl. ................................. 60/652; 60/682; 60/659
[58] Field of Search ............ 60/644, 650, 652, 659, 60/682

[56] References Cited

U.S. PATENT DOCUMENTS

| | | | |
|---|---|---|---|
| 3,512,358 | 5/1970 | Schmidt | 60/644 X |
| 3,859,795 | 1/1975 | Frutschi | 60/652 |
| 3,895,492 | 7/1975 | Förster et al. | 60/659 |

*Primary Examiner*—Allen M. Ostrager
*Assistant Examiner*—Stephen F. Husar
*Attorney, Agent, or Firm*—Burns, Doane, Swecker & Mathis

[57] ABSTRACT

An arrangement for controlling the power output of a closed cycle type of thermodynamic system including shaft-coupled compressor and gas turbine components driving a load such as an electrical generator in which the gaseous working medium flows in a closed circulation system that includes a device for imparting heat to the gas and a storage tank for the gas connected in parallel with a section of the gas circulation system. In order to vary the power output, gas from the circulation system in a cold or hot state, respectively, is flowed through the tank for heat exchange with the gas in the tank such that as a result of the corresponding change produced in the density of the gas within the tank, gas is selectively withdrawn from or delivered into the circulation system.

17 Claims, 8 Drawing Figures

METHOD FOR REGULATING THE POWER OUTPUT OF A THERMODYNAMIC SYSTEM OPERATING ON A CLOSED GAS CYCLE AND APPARATUS FOR CARRYING OUT THE METHOD

The present invention relates to an improvement in the method for controlling the operation of a thermodynamic, closed cycle system, such as a turbo-machine group including a gas turbine driving a compressor and an electrical generator, wherein the gaseous working medium circulates within the system in a closed cycle, and an apparatus by which the improved method can be performed.

BACKGROUND OF THE INVENTION

When the quantity of the gaseous working medium flowing in a closed-cycle gas turbine system is controlled there takes place solely a proportional change in gas pressures at various locations within the circulation system while the aerodynamic and thermodynamic conditions remain constant for all practical purposes. The mechanical efficiency of the system will therefore retain its designed magnitude over a wide range of power load. This type of gas quantity control represents for this reason the primary method of regulating closed-cycle gas turbine systems. Any improvement and simplification of the various components necessary for performing the gas quantity control is therefor desirous and advantageous.

It is immaterial for gradual changes in power output of a closed-cycle type of gas turbine system whether gaseous working medium is added or removed, respectively at the high-pressure side or the low-pressure side of the gas circulating system. An intermediate pressure storage in cascade connection, as illustrated in FIG. 1, is particularly suitable for changing the output within a maximum and a specifically set minimum value when using a filling gas quantity control mode of operation.

In order to accomplish a reduction in load, gas storage tanks $S_1$ to $S_n$ as in FIG. 1 can be charged in succession by means of valve controls, with the gaseous working medium being removed from the system at the output side of the compressor V.

In order to accomplish an increase in the power output of the turbo-machine group, gaseous working medium can be returned to the system at the low-pressure side, e.g., at the inlet side to the compressor. The tanks $S_1$ to $S_n$ will then discharge the gas, again in succession until the pressure is equalized as desired.

In order to attain a rapid increase in load, the so-called load surges, it is necessary to inject the gas into the system at a point of higher pressure, at the earliest between two serially connected compressor sections $V_1$, $V_2$, (FIG. 2) and a neutral transitory attitude can then be attained only when the second compressor section $V_2$ has a pressure ratio that is not higher than the pressure ratio of the first compressor section $V_1$.

When gases possessing great isentropic exponents are utilized, the optimum pressure ratios for closed-cycle turbo-machine groups operating with a recuperator in the circuit will be small so that the storage tanks described above will have a relatively small effective pressure head only.

Another arrangement for controlling the quantity of the gaseous working medium circulating in the closed system which has been employed in an experimental turbo-machine plant utilizes a high-pressure gas intake, as illustrated in FIG. 3. The change-over behavior that can be attained by this arrangement when controlling the power output is very positive, and permits immediate load surges. Unfortunately, an auxiliary compressor is needed in order to charge the storage tank thus making the apparatus more complicated and more costly.

SUMMARY OF THE INVENTION

The object of the present invention is to provide an improved method and related apparatus which will permit a gradual as well as a sudden load control without the need for providing expensive additional machine components. The invention solves the problem in that a storage tank for the gaseous working medium is connected in parallel with sectional portions of the closed gas circulating circuit and in such manner that hot or cold gas can flow selectively through the storage tank, with the result that due to the change in density of the gas stored within the tank, gas is either withdrawn from the gas circulating circuit or is delivered into that circuit.

It is advantageous if the gas flowing through the storage tank also flows through heating, or cooling, elements thereby making possible an increase in the range of control.

DETAILED DESCRIPTION OF PREFERRED EMBODIMENTS

With reference now to the drawings, like components in all of the views have been identified by like reference symbols. Each of the turbo-machine groups include a compressor V, a gas turbine T, an electrical generator G, all coupled to the same shafting, as well as a pre-cooler VK, a heat exchanger R, a gas heater LE and a storage tank S. The gaseous working medium circulates through the system in a closed type of circuit and the direction of flow of the gas is indicated by arrows.

Figure 4:
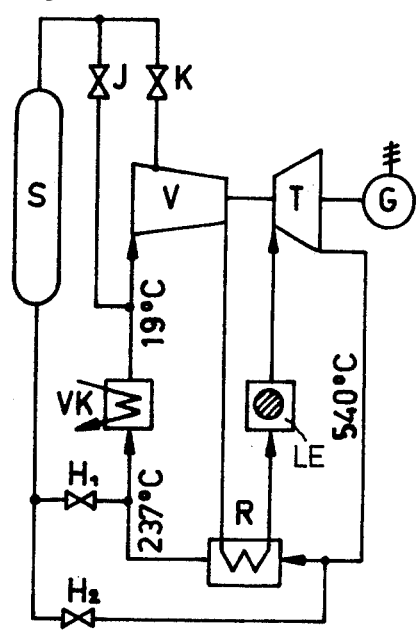

The basic gas flow circuit arrangement of the components V, T, VK, LE, and R is the same in all of the different figures. However, in one embodiment of the present invention according to FIG. 4, which operates by direct heating, or cooling, respectively, of the volume of gas within the storage tank S, it will be seen that connections with the tank extend (1) to a junction point in the gas circuit intermediate the pre-cooler VK and the inlet to compressor V by way of a control valve J, (2) to a point within compressor V intermediate its inlet and outlet by way of a control valve K, (3) to a junction point in the gas circuit intermediate heat exchanger R and pre-cooler VK by way of a control valve $H_1$, and (4) to a junction point in the gas circuit intermediate heat exchanger R and the outlet side of gas turbine T by way of a valve $H_2$. By opening valves K and $H_1$, the storage tank S can be cooled and filled with gas of lower temperature. In this case, the gas content of the tank has the greatest possible density which means that the tank is in its charged state. The opposite effect is brought about by opening of the valves $H_1$ and J causing the temperature of the gas within the storage tank S to increase from e.g., 19° C. to 237° C., so that gas is forced out of the tank into the gas circulating system. In order to maintain a stable state within the system, only a very slight circulation of gas through the storage tank is needed to compensate for thermal losses. By opening valve $H_2$ rather than valve $H_1$, the gas temperature within the storage tank can be increased—in the case of the example selected—to 540° C., resulting in a still greater rarefication of the gas within the tank. Naturally this rarefication is somewhat curtailed by the desired pressure rise within the gas circulating system, and consequently within the storage tank. If it is desired to accomplish in this manner a pressure rise, i.e., an enlargement of the gas filling in the circulation system by a factor of 1.4 while the temperature ratio is:

$$\frac{T_{max}}{T_{min}} = \frac{540 + 273}{19 + 273} = 2.8,$$

it is possible to shift 50% of the tank volume because:

$$\frac{m_1}{m_2} = \frac{p_1 \cdot V_s}{R \cdot T_1}$$

$$\frac{p_2 \cdot V_s}{R \cdot T_2} = \frac{p_1 \cdot T_2}{T_1 \cdot p_2}$$

$$\frac{m_1}{m_2} = \frac{60 (540 + 273)}{(19 + 273) 1.4 \cdot 60} = 2$$

wherein:
m represents the gas mass within the tank
p represents the gas pressure within the tank
T represents the gas temperature within the tank.

Figure 5:
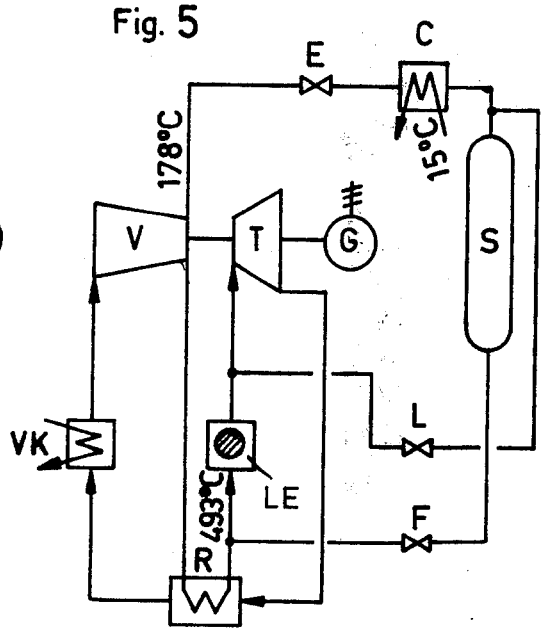

However, instead of being connected into the gas circulation system at the low pressure side, the storage tank S can also be connected into the gas circulation system at the high pressure side as illustrated in the embodiment according to FIG. 5. In this embodiment, gas connections with the tank S extend (1) to the outlet side of compressor V by way of a valve E connected in series with a cooler C, (2) to a junction point in the gas circuit between the outlet side of gas heater LE and the inlet side of turbine T by way of a valve L, and (3) to a junction point in the gas circuit between heat exchanger R and the inlet side of gas heater LE by way of a valve F.

In accordance with the arrangement illustrated in FIG. 5 the gas content within tank S can be brought up to its greatest density by opening valve E and a flow of cold water through cooler C. If the cooling water is turned off, the gas temperature within the tank S will rise—in case of the example shown—to 178° C., so that gas will be forced from the tank into the circulation system.

However, if valve L is opened while valve E remains closed, gas at a temperature of 403° C. will flow through and fill the tank so that the gas density within the tank is reduced to a minimum and the gas content within the circulating system rises to a maximum. It is also feasible, but not necessary, to utilize blowers or injectors in lieu of the natural pressure gradient existing within the circulation system.

Figure 1:
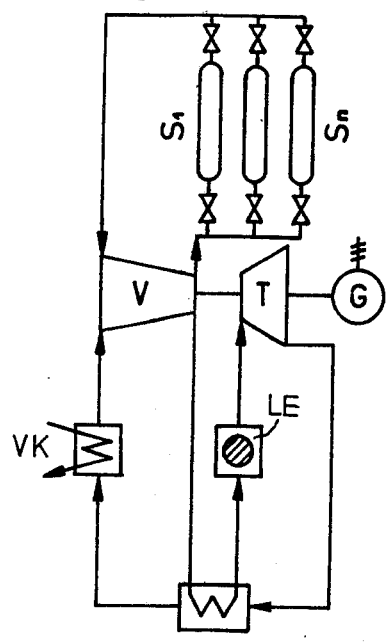
FIGS. 1, 2, and 3 show in schematic form three different arrangements of a turbo-machine group representing the state of the prior art, each operating on a closed circuit type of gas circulation system and each with a different arrangement of a storage tank and means connected therewith for selectively removing gas from, or adding it to, the closed gas circuit.
Figure 2:
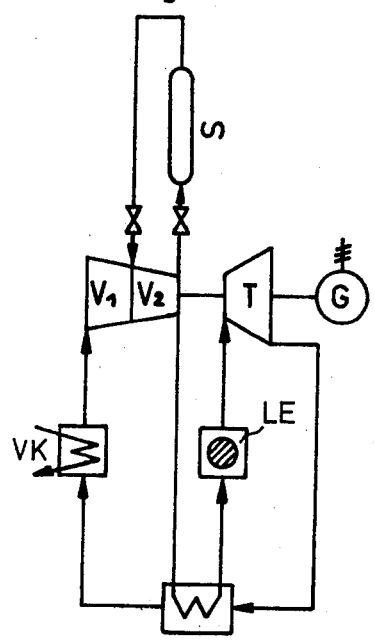
Figure 3:
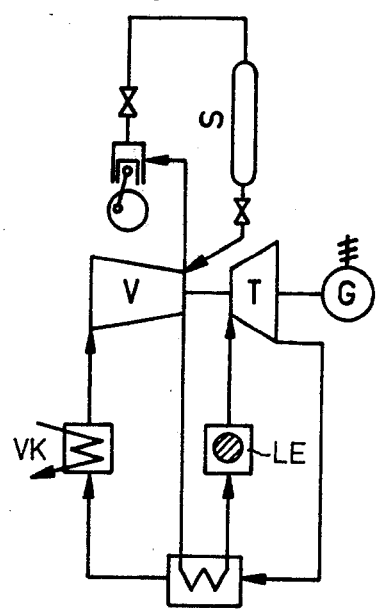
Figure 6:
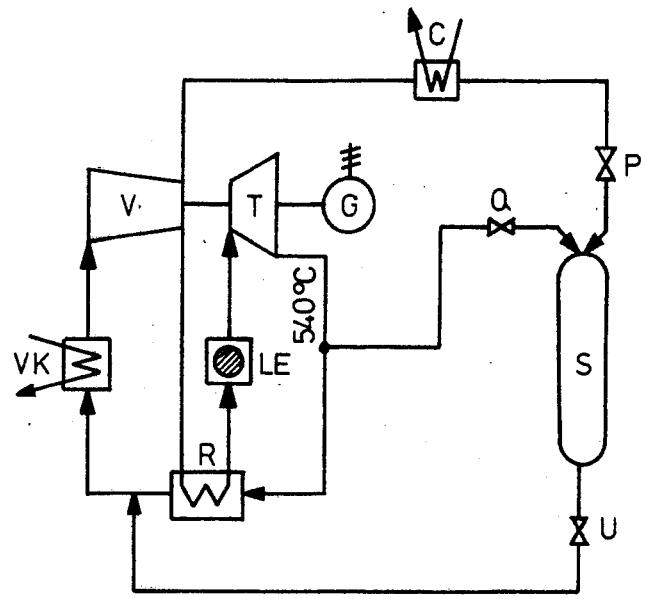

Obviously, this storage tank principle can also be combined with the prior art embodiments illustrated in FIGS. 1 and 2 and the storage tanks of the latter can then have smaller volumes. FIG. 6 illustrates an example of such a combination wherein connections with the tank S extend (1) to the outlet side of compressor V by way of a cooler C and valve P connected in series, (2) to a junction point in the gas circuit between heat exchanger R and the outlet side of turbine T by way of valve O, and (3) to a junction point in the gas circuit between heat exchanger R and the inlet to pre-cooler VK by way of a valve U.

When operating with minimum output from the turbo-set V, T, and G, i.e., the lowest output that can be set by means of this particular control method, a pressure compensation exists between the outlet of compressor V and tank S by way of valve P which is open. The gas temperature within tank S is assumed to be 19° C. At the low pressure side of the gas turbine circulating system a low pressure exists, and it is therefore possible, by closing valve P, and the subsequent opening of valve U to permit gas to flow out of tank S into the gas circulating system, in the example illustrated, ahead of the pre-cooler VK. Up to this point, the process control corresponds to those of FIGS. 1 and 2.

If valve Q is now opened, hot turbine gas will begin to flow into the tank S due to the flow resistance within the heat exchanger R, driving out the cold gas through valve U which is still open. This will result in a further lowering of the gas density within the tank and a corresponding further increase in density within the gas circulation system, and the power performance of the turbo-set V, T, G will, in this manner reach its maximum.

Figure 7:
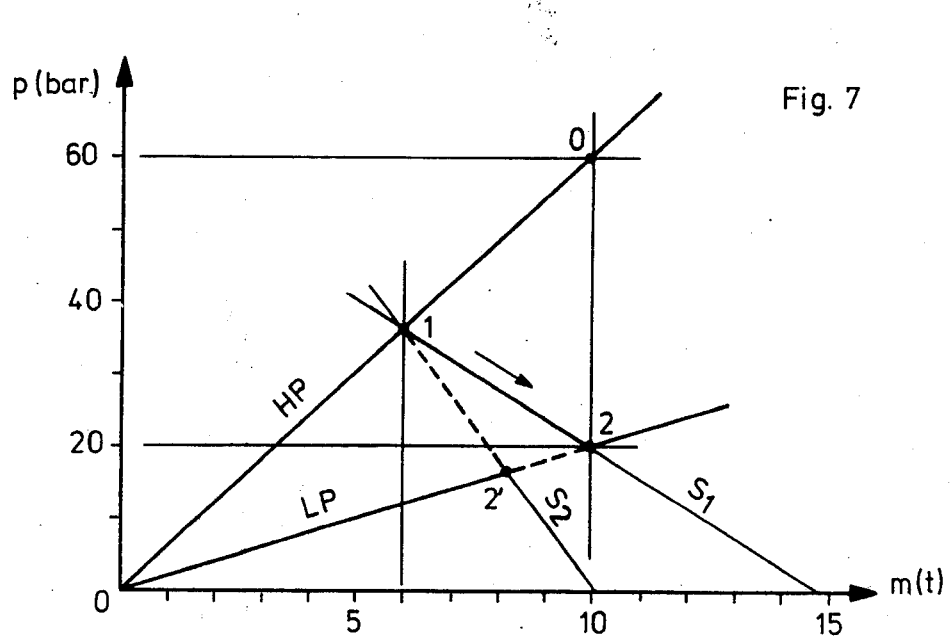
FIG. 7 is a graph depicting variation of the gas pressure as a function of its mass.

FIG. 7 illustrates these inter-related processes in a pressure/mass graph. The lines running from the upper right to the lower left depict respectively the pressures within the gas circulation system at the high-pressure side (HP) as well as at the low-pressure side (LP). The lines running from the upper left to the lower right indicate the pressures within the storage tank S.

The trace 1-2 is a line showing the gas discharge from a storage tank with a constant temperature of 19° C. If it is desired that 4,000 kg. of the gaseous medium, e.g., helium, flow out, beginning at point 1 and ending at point 2, the tank must have a volume of 1,520 m³.

If, however, at the end of the outflow process, the storage tank is heated and brought up to the temperature level at the turbine outlet, i.e., in the example shown, to 540° C., a tank volume of 850 m³ will suffice for the delivery of 4,000 kg. of helium. The course of the gas discharge is now shown by the broken trace lines, namely, from 1 to 2' by the flowing out at a constant temperature, and from 2' to 2 by the driving out due to the rise in temperature.

It is thus demonstrated that in the case of the limiting conditions set in the example shown, the specific control offered by the invention make possible either (1) a reduction of the volume of the storage tank S by the factor:

$$\frac{850 \, m^3}{1{,}520 \, m^3} = 0.56$$

or (2) an increase of the range of control by the reciprocal factor of 1.79 if the volume of the storage tank remains unchanged.

Figure 8:
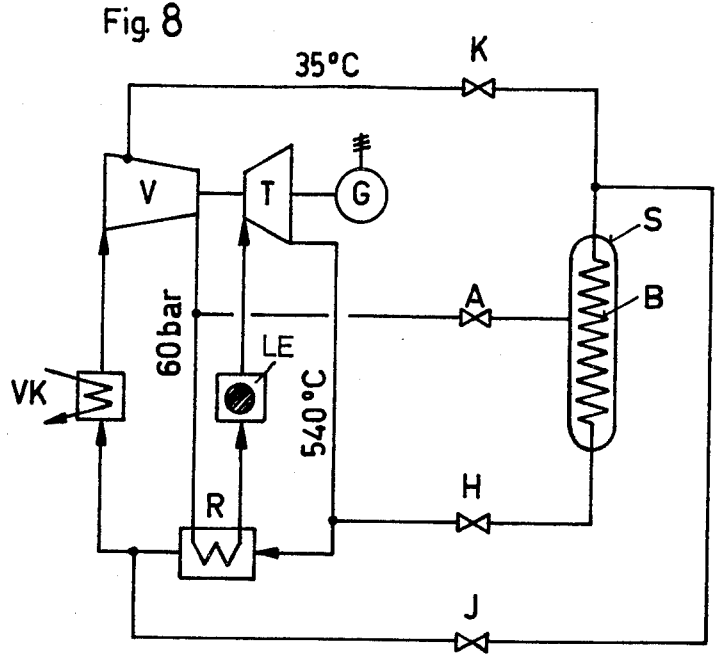
FIGS. 4, 5, 6, and 8 are likewise illustrations in schematic form of four different arrangements of a turbo-machine group also operating on a closed circuit type of gas circulation system and each with a different arrangement of a storage tank and means connected therewith for selectively removing gas from, or adding it to, the closed gas circuit, in accordance with the invention.

The principle of heating and cooling the gas storage tank by components which are placed in parallel with sectional portions of the closed gas circulation system can be realized indirectly, and FIG. 8 illustrates an embodiment of such a method. A helically formed tubing B located within the gas storage tank S is provided to heat, or cool, respectively, the gas within the tank. The storage tank gas pressure is thus no longer identical with the pressure of the gas flowing in the closed gas circulation system of the turbo-set. The tubing B is connected at one end by way of valve K to an intermediate point within the compressor V and also by way of a valve J to a junction point in the main gas circulation circuit intermediate the inlet to a pre-cooler VK and heat exchanger R. The other end of tubing B is connected by way of a valve H to a junction point in the main gas circulation circuit intermediate the outlet of turbine T and heat exchanger R. The interior of tank S is connected by way of valve A to a junction point in the main gas circulation circuit intermediate the outlet from compressor V and the heat exchanger R.

With the arrangement illustrated in FIG. 8 it will now be possible to connect the tubing B within the tank S by way of valves H, J, and K to the low-pressure side of the circulation system, while connecting the interior of storage tank S to the high-pressure side of the circulation system by way of valve A.

If valves K and H are open, cold gas, for example at a temperature of 35° C. will flow through the tubing B. The gas contained within tank S is cooled off and its pressure will drop, with the volume remaining constant. If valve A is opened, gas can then flow out from the circulation system until a pressure balance with the cold gas content of the tank is attained. The gas pressure of the circulation system which, at the beginning, amounts to 60 bar behind the compressor V, is thus lowered, and all other gas pressures within the circulation system are also lowered proportionally. The power output of the turbo-set is likewise reduced proportionally.

If valve A is now closed off and valve J is opened in place of valve K, with valve H remaining open, the gas content within the storage tank S is heated up while its volume remains constant, with the result that the gas pressure within the tank will rise. If valve A is now opened, an intensive outflow of gas from the tank into the high-pressure side of the gas circulation system will occur, causing a rapid increase of power output with a positive instantaneous effect, as required for example for the purpose of generator-frequency support. When using temperatures of 35° C. and 540° C. given in the example as a basis, it becomes possible to attain inside the storage tank S a pressure ratio of:

$$\frac{p_2}{p_1} = \frac{540 + 273}{35 + 273} = 2.6$$

I claim:

1. In the method for controlling the power output of a closed cycle type of thermodynamic system such as a gas turbine power plant wherein a gaseous working medium circulates through components of the system including a heat exchanger, a compressor and a turbine in a closed circuit, the improvement wherein a storage tank for the gaseous working medium is connected in parallel with at least three sectional portions of the closed circuit and wherein gaseous working medium in a hot or cold state selectively is flowed through the storage tank such that due to the corresponding change in gas density within the tank, the gaseous working medium is selectively withdrawn from the closed circuit or the gaseous working medium is delivered into the closed circuit.

2. In the method for controlling the power output of a closed cycle type of thermodynamic system such as a gas turbine power plant wherein a gaseous working medium circulates through components including a heat exchanger, a compressor and a turbine in a closed circuit, the improvement wherein a storage tank for the gaseous working medium is connected in parallel with sectional portions of the closed circuit and wherein the gaseous working medium in a hot or cold state selectively is flowed through the storage tank in such manner as to indirectly heat or cool the gaseous working medium within the tank such that due to the corresponding change in gas density within the tank, the gaseous working medium is selectively withdrawn from the closed circuit or is delivered into the closed circuit.

3. Apparatus for controlling the power output of a closed cycle type of thermodynamic system such as a gas turbine power plant including a heat exchanger, a shaft-coupled compressor and a turbine, and a closed gaseous working medium circulation system including means for imparting heat to the gaseous working medium in circulation, a storage tank for the gaseous working medium connected in parallel with at least three sections of the gaseous working medium circulation system, and valve controlled means for selectively flowing a portion of the gaseous working medium in a hot or cold state respectively from the circulation system through said storage tank such that due to the corresponding change in gas density produced within said storage tank, the gaseous working medium is selectively withdrawn from or added to the gaseous working medium flowing in the system.

4. Apparatus as defined in claim 3 wherein the gaseous working medium in the hot or cold state flowed through said storage tank mixes directly with the gaseous working medium stored in the tank.

5. Apparatus for controlling the power output of a closed cycle type of thermodynamic system such as a gas turbine power plant including a heat exchanger, a shaft-coupled compressor and turbine and a closed gaseous working medium circulation system including means for imparting heat to the gaseous working medium in circulation, a storage tank for the gaseous working medium connected in parallel with a section of the gaseous working medium circulation system, and valve controlled means for selectively flowing a portion of the gaseous working medium in a hot or cold state respectively from the circulation system through said storage tank through a heat exchange coil located within said tank thereby effecting heat exchange with the gaseous working medium stored within the tank in an indirect manner such that due to the corresponding change in gas density produced within said storage tank, the gaseous working medium is selectively withdrawn from or added to the gaseous working medium flowing in the system.

6. A closed cycle type of thermodynamic system, having a controlled power output, comprising:
   a shaft coupled compressor and gas turbine;
   a heat exchanger;
   a pre-cooler;
   a gas heater;
   closed circulation conduit means for circulating gas in a continuous path from the compressor, to the heat exchanger, to the gas heater, to the turbine, to the heat exchanger, to the pre-cooler and back to the compressor;
   a storage tank selectively connectable with at least three portions of the closed circulation conduit means.

7. The system of claim 6 wherein the storage tank is selectively connectable:
   between an outlet of the turbine and an inlet of the heat exchanger;
   between an outlet of the heat exchanger and an inlet of the compressor; and
   to an outlet of the compressor by way of a cooler.

8. The system of claim 6 wherein the storage tank is selectively connectable:
   to an outlet of the compressor by way of a cooler;
   between an outlet of the gas heater and an inlet of the turbine; and
   between an outlet of the heat exchanger and an inlet of the gas heater.

9. The system of claim 6 wherein the storage tank is selectively connectable:
   between an outlet of the turbine and an inlet of the heat exchanger;
   between an outlet of the heat exchanger and an inlet of the pre-cooler;
   between an outlet of the pre-cooler and an inlet of the compressor; and
   to the compressor at a point within the compressor that is intermediate of the inlet and outlet of the compressor.

10. The system of claim 6 wherein the three portions of the closed circulation conduit means to which the storage tank are selectively connectable are all at substantially the same pressure.

11. A closed cycle type of thermodynamic system, having a controlled power output, comprising:
    a shaft coupled compressor and gas turbine;
    a heat exchanger;
    a pre-cooler;
    a gas heater;
    closed circulation conduit means for circulating gas in a continuous path from the compressor, to the heat exchanger, to the gas heater, to the turbine, to the heat exchanger, to the pre-cooler and back to the compressor;
    a storage tank selectively directly connectable to at least one portion of the closed circulation conduit means and having a heat exchange conduit within the storage tank selectively connectible to at least three portions of the closed circulation conduit means.

12. The system of claim 11 wherein:
    the storage tank is directly connectable between an outlet of the compressor and an inlet of the heat exchanger, and the heat exchanger conduit within the storage tank is selectively connectible
    between an outlet of the heat exchanger and and an inlet of the pre-cooler,
    between an outlet of the turbine and an inlet of the heat exchanger, and
    to the compressor at a point within the compressor that is intermediate of the inlet and outlet of the compressor.

13. The system of claim 11 wherein the three portions of the closed circulation conduit means to which the heat exchanger conduit within the storage tank are selectively connectable are all at substantially the same pressure.

14. A method of controlling the power output of a closed cycle type of thermodynamic system having gas at various temperatures throughout the closed system ranging between a relatively low temperature and a relatively high temperature, comprising the steps of:
    selectively cooling a storage tank of the thermodynamic system by supplying gas to the storage tank from at least a first portion of the system at a relatively low temperature;
    selectively heating the storage tank to an intermediate temperature by supplying gas to the storage tank from at least a second portion of the system at a relatively intermediate temperature; and
    selectively heating the storage tank to a relatively high temperature by supplying gas to the storage tank from at least a third portion of the system at a relatively high temperature.

15. The method of claim 14 wherein the storage tank is supplied directly with gas from the first, second and third portions of the thermodynamic system.

16. The method of claim 14 wherein the storage tank is supplied indirectly with gas from the first, second and third portions of the thermodynamic system by passing the gas through a heat exchange conduit of the storage tank.

17. The method of claim 14 wherein the gas supplied to the storage tank is at substantially the same pressure at the first, second and third portions of the system.

* * * * *